United States Patent [19]

Moorhead

[11] Patent Number: 5,404,296
[45] Date of Patent: Apr. 4, 1995

[54] MASSIVELY PARALLEL COMPUTER ARRANGEMENT FOR ANALYZING SEISMIC DATA PURSUANT TO PRE-STACK DEPTH MIGRATION METHODOLOGY

[75] Inventor: William D. Moorhead, Houston, Tex.

[73] Assignee: Tinking Machines Corporation, Cambridge, Mass.

[21] Appl. No.: 765,172

[22] Filed: Sep. 25, 1991

[51] Int. Cl.⁶ .............................................. G01V 1/30
[52] U.S. Cl. ........................................ 364/421; 367/72
[58] Field of Search ....................... 364/420, 421, 422; 367/38, 51, 53, 58, 69, 72

[56] References Cited

U.S. PATENT DOCUMENTS

| | | | |
|---|---|---|---|
| 4,393,488 | 7/1983 | Gassaway et al. | 367/75 |
| 4,479,205 | 10/1984 | Gray | 367/63 |
| 4,736,347 | 4/1988 | Goldberg et al. | 367/46 |
| 4,745,585 | 5/1988 | Larner | 367/50 |
| 4,821,164 | 4/1989 | Swanson | 364/420 |
| 5,050,069 | 9/1991 | Hillis et al. | 364/DIG. 1 |
| 5,198,979 | 3/1993 | Moorhead et al. | 364/421 |

FOREIGN PATENT DOCUMENTS 8601918 3/1986 WIPO.

OTHER PUBLICATIONS

Madisetti et al. "Seismic Migration algorithms on parallel computers" 3rd Conf. on Hypercube Concurrent Computers & Applications, vol. II—Applications, 1988 pp. 1180–1186.

Kelley et al. "High speed migration of multidimensional Seismic data" Proceedings I CASSP, IEEE International Conference on Acoustics Speech and Signal processing. May 1991 pp. 1117–1120.

Kindelan et al, "Parallelism in Seismic Computing" Survey in Geophysics vol. 110, No. 2-4 pp. 377–388, Dec. 1989.

Primary Examiner—Gail O. Hayes
Assistant Examiner—A. Bodendorf
Attorney, Agent, or Firm—Richard A. Jordan

[57] ABSTRACT

A massively parallel computer arrangement and method for processing seismic data, comprising signal amplitude as received by a plurality of receivers each for a plurality of shots, to generate a profile of subterranean formations. Initially, the arrangement, iteratively for a plurality of subsets of the shot data referred to as "shot chunks," converts, the signal amplitude data into frequency component amplitude data identifying the amplitudes of the frequency components of the signal data. After that is done for all of the shot chunks, the arrangement iteratively processes the amplitude data for successive frequency chunks to generate a profile, during each iteration iteratively generating profile information for successive subterranean layers and processing the frequency component amplitude data to downward-migrate the receiver and shot data to facilitate generating profile information for the next layer.

21 Claims, 9 Drawing Sheets

INITIAL ORGANIZATION
OF SEISMIC DATA
IN PROCESSOR
ARRAY

STORAGE ORGANIZATION FOR
MASS DATA STORAGE SYSTEM

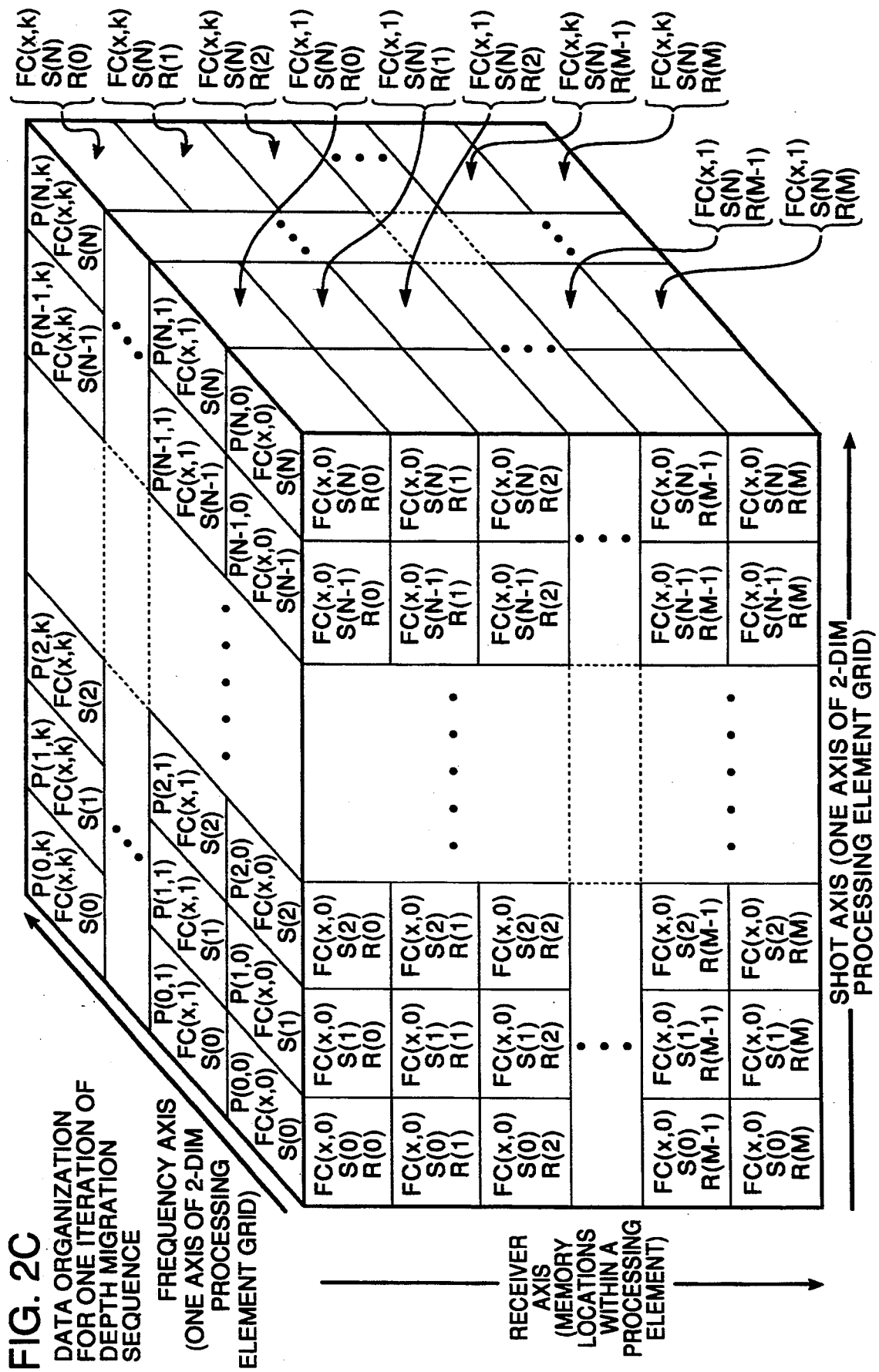

MIGRATED DATA
ACCUMULATOR ARRAY
DATA ORGANIZATION

Figure 3

70. ESTABLISH A PROCESSING ELEMENT GRID HAVING TWO DIMENSIONS, DEFINED BY ONE AXIS WHICH WILL BE USED TO ACCOMMODATE AT LEAST THE NUMBER OF RECEIVERS REPRESENTED IN THE SEISMIC DATA AND A SECOND AXIS

71. USING THE NUMBER OF PROCESSING ELEMENTS ALONG THE SECOND AXIS OF THE GRID, IDENTIFIY THE MAXIMUM NUMBER OF SHOTS THAT CAN BE INCLUDED IN A SHOT CHUNK

72. ENABLE LOADING OF SUCH DATA AS DEFINES A SHOT CHUNK FROM MASS STORAGE SYSTEM INTO MEMORIES OF PROCESSING ELEMENTS OF MASSIVELY PARALLEL COMPUTER SYSTEM.

73. ENABLE ALL PROCESSING ELEMENTS TO PERFORM FOURIER TRANSFORM OPERATION IN CONNECTION WITH DATA IN THEIR RESPECTIVE MEMORIES TO GENERATE FREQUENCY-SPECTRUM AMPLITUDE VALUES IN CONNECTION WITH SHOT CHUNK.

74. ENABLE PROCESSING ELEMENTS TO TRANSMIT FREQUENCY-SPECTRUM AMPLITUDES TO MASS STORAGE SYSTEM

75. HAS DATA FROM ALL SHOTS BEEN PROCESSED?  — NO
    | YES

76. DETERMINE THE NUMBER OF FREQUENCY CHUNKS TO DIVIDE THE FREQUENCY-SPECTRUM AMPLITUDE DATA INTO, USING THE NUMBER OF SHOTS AND THE NUMBER OF FREQUENCIES WHOSE AMPLITUDE VALUES WERE GENERATED.

Figure 4A

100. ESTABLISH A FREQUENCY CHUNK LOOP TERMINATION IDENTIFIER IDENTIFYING THE NUMBER OF PREVIOUSLY-GENERATED FREQUENCY CHUNKS

101. ESTABLISH AND INITIALIZE A FREQUENCY CHUNK INDEX COUNTER

102. ESTABLISH A TWO-DIMENSIONAL MIGRATED DATA ACCUMULATOR ARRAY (FIG. 2D) IN PROCESSING ELEMENT MEMORIES PARALLEL TO MEMORY PLANE DEFINED BY SHOT AXIS AND RECEIVER AXIS DEPICTED IN FIG. 2C

103. ESTABLISH A DEPTH MIGRATION TERMINATION IDENTIFIER IDENTIFYING THE NUMBER OF DEPTH MIGRATION STEPS TO BE PERFORMED

104. ESTABLISH A DEPTH MIGRATION INDEX COUNTER

105. INITIALIZE DEPTH MIGRATION INDEX COUNTER

|D|
(FROM FIG 4C)

106. LOAD DATA CORRESPONDING TO FREQUENCY CHUNK IDENTIFIED BY FREQUENCY CHUNK COUNTER INTO PROCESSING ELEMENT MEMORIES AND TRANSPOSE TO ORIENTATION DEPICTED IN FIG. 2C

107. SELECT A ZERO-OFFSET AXIS OFFSET IDENTIFIER BASED ON PREVIOUSLY-PROVIDED ZERO-OFFSET AXIS DATA

|A|
(TO FIG. 4B)

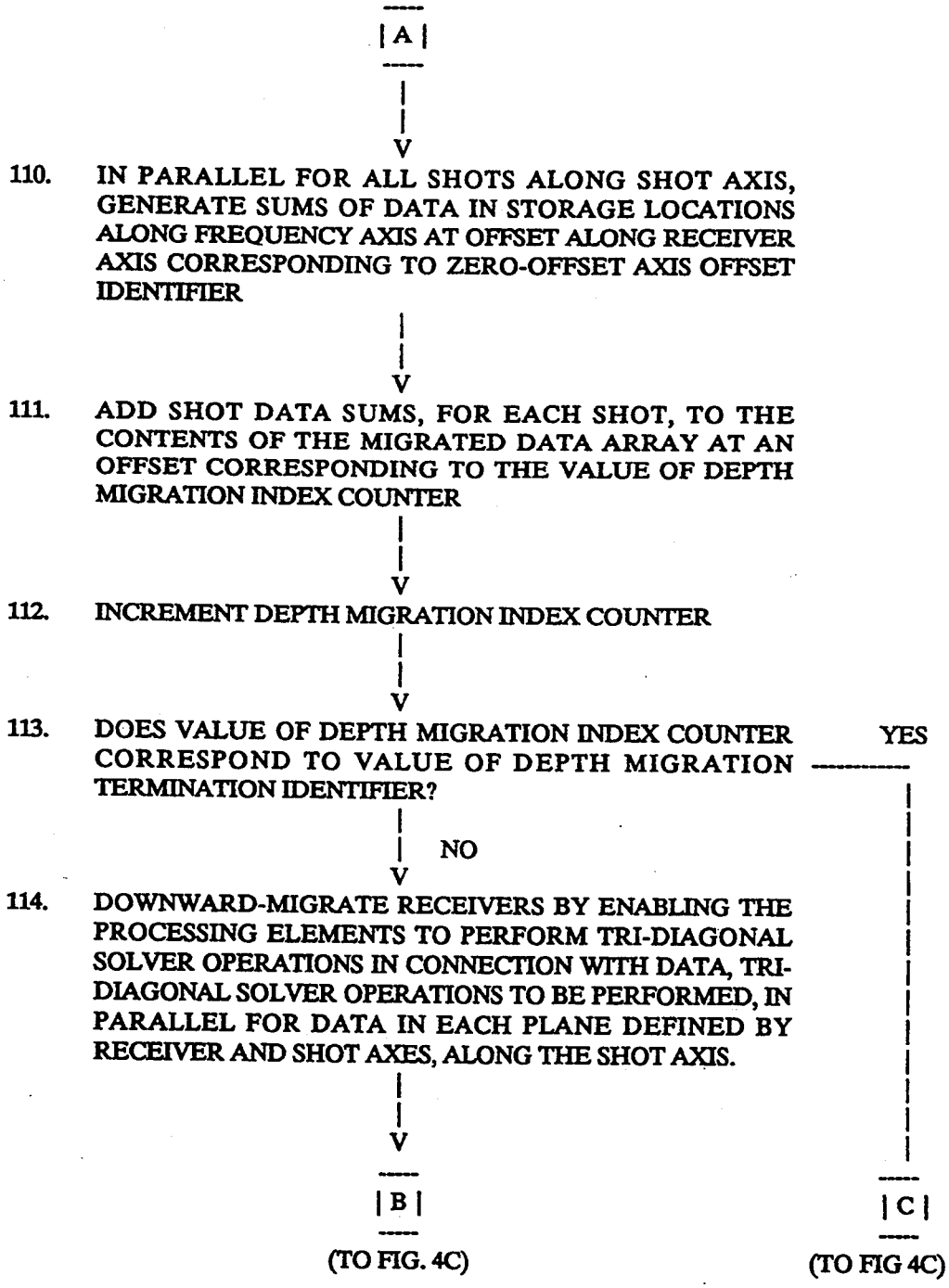

Figure 4C (FROM FIG. 4B)
|B|
↓

115. DOWNWARD-MIGRATE SOURCE BY ENABLING THE PROCESSING ELEMENTS TO PERFORM TRI-DIAGONAL SOLVER OPERATIONS IN CONNECTION WITH DATA, TRI-DIAGONAL SOLVER OPERATIONS TO BE PERFORMED, IN PARALLEL FOR DATA IN EACH PLANE DEFINED BY RECEIVER AND SHOT AXES, ALONG THE RECEIVER AXIS.

↓
|A|
(TO FIG. 4B)

(FROM FIG. 4B)
|C|
↓

116. INCREMENT FREQUENCY CHUNK INDEX COUNTER

↓

117. DOES VALUE OF FREQUENCY CHUNK INDEX COUNTER CORRESPOND TO VALUE OF FREQUENCY CHUNK LOOP TERMINATION IDENTIFIER?    YES ----------

| NO
↓
|D|
(TO FIG. 4A)

↓
120. EXIT

MASSIVELY PARALLEL COMPUTER ARRANGEMENT FOR ANALYZING SEISMIC DATA PURSUANT TO PRE-STACK DEPTH MIGRATION METHODOLOGY

REFERENCE

U.S. Pat. No. 4,598,400, issued Jul. 1, 1986, to W. Daniel Hillis, for Method and Apparatus For Routing Message Packets, and assigned to the assignee of the present application.

U.S. Pat. No. 4,814,973, issued Mar. 21, 1989, to W. Daniel Hillis, for Parallel Processor, and assigned to the assignee of the present application.

U.S. Pat. No. 4,984,235, issued Jan. 8, 1991, to W. Daniel Hillis, et al, for Method and Apparatus For Routing Message Packets, and assigned to the assignee of the present application.

U.S. Pat. No. 5,050,069, issued Sep. 17, 1991, to W. Daniel Hillis, et al., for Method And Apparatus For Simulating M-Dimensional Connection Networks In An N-Dimensional Network Where M Is Less Than N, and assigned to the assignee of the present application.

U.S. patent application Ser. Nos. 07/906,006, now U.S. Pat. No. 5,202,979 which is a continuation of 07/703,580, filed May 20, 1991, now abandoned in the name of W. Daniel Hillis, et al., for Storage System Using Multiple Mechanically-Driven Storage Units, and assigned to the assignee of the present application.

J. Claerbout, *Fundamentals Of Geophysical Data Processing*, (New York: McGraw-Hill Book Co. Inc., 1976).

G. Blelloch, *Vector Models For Data-Parallel Computing*, (Cambridge, Mass.: MIT Press, 1990).

FIELD OF THE INVENTION

The invention relates generally to the field of digital computers, and more particularly to a massively parallel computing system for processing seismic data according to a pre-stack migration methodology.

BACKGROUND OF THE INVENTION

Companies involved in, for example, oil exploration use seismic prospecting techniques to model the earth's interior with a view towards locating areas likely to contain oil before expending large amounts in drilling. In seismic prospecting over a particular area, a source of sound energy and receivers are arrayed over the area in a selected arrangement. The source transmits pulses of sound energy at the earth and the receivers receive energy which is reflected due to subsurface structural features, such as discontinuities between diverse rock and other formations. Typically, the operations are repeated a number of times with diverse arrangements of source and receivers over the area. The pattern of time delays between the transmission by the source and reception at the various receivers for the various source/receiver arrangements provides information as to the subsurface structure. If a test area, that is, the area whose subsurface structure is being investigated, has a subsurface structure which is similar to the subsurface structure of areas which are known to have oil, the likelihood that the test area also has oil is enhanced. Thus, knowledge of the subsurface structure can operate as a guide to areas where test drilling may be worthwhile.

As a more specific example, in modelling the interior of the earth under a body of water such as an ocean, typically an exploration vessel pulls a sound source and a plurality of equally-spaced receivers forming a linear array floating on the surface of the water. At a particular point of the area to be modelled, the source transmits a sound pulse directed toward the ocean floor. As the pulse reaches the ocean floor, some of the pulse energy will be reflected back toward the ocean surface and part will be absorbed into the ocean floor. As the absorbed portion continues travelling downwardly under the ocean floor, it will encounter discontinuities in the subsurface structures such as sand and rock strata formations which will also partially reflect portions of the pulse's energy back toward the ocean surface. The unreflected pulse energy may continue downwardly, with portions being reflected at subsequently-encountered discontinuities, until it finally dissipates.

During such a "shot," the receivers continuously record the amplitude of received audio signals, in at least the audio-frequency band of the signals transmitted by the source, as a function of time from the transmission by the source. Generally, each receiver will record the amplitude digitally, that is, it will record the amplitude as a number whose value represents a relative amplitude level, at each of a plurality of successive time intervals from the beginning of the shot. Normally, the amplitudes, and thus the recorded numbers, will be relatively low. However, when reflected pulse energy arrives at a receiver, the signal amplitude as recorded thereby will be relatively large. The time intervals from the time the source transmits the sound energy and the times pulse energy is received by the receivers, provides information as to the depths of the discontinuity at which the pulse was partially reflected, in the area of the ocean under the receiver array. After a selected time period, which may be related to the dying-out of reflected signals or the depth from which reflected signals would be received, the linear array is then moved a selected distance in a direction along the array and the procedure repeated. The record of signal amplitudes as recorded by the receivers provides information as to the structure of the formations of sand and row strata below the ocean floor, which, in turn, may assist in locating areas where oil is likely to be found under the ocean floor. Similar operations may be performed to generate a profile of subterranean discontinuities beneath the surface of the earth on land.

In analyzing tile information accumulated by the receivers, it is normally assumed that the receivers receive the reflected signal along a signal path that is generally vertical. This assumption is generally valid for formations defined by discontinuities that are generally planar and horizontal or sloping at shallow angles, since the perpendicular to the surface of such a discontinuity is generally vertical and the path of the reflected signal is close to being parallel thereto. However, the assumption is not valid for formations defined by discontinuities at steep angles or that are curved. If the perpendicular to the surface of the discontinuity substantially deviates from the vertical, the assumption will result in the model of the discontinuity being at a significantly different angle.

Similarly, if a discontinuity is curved, the assumption will render the discontinuity as having a substantially larger or smaller effective diameter at the same depth. For example, if the sound pulse is reflected from a concave discontinuity, the receivers will effectively model the discontinuity as having a larger diameter, as a function of depth, than it actually has, with the increase in size being inversely related to the effective diameter of the discontinuity. In addition, portions of the surface of the discontinuity whose perpendiculars increasingly deviate from the vertical will be increasingly modeled as being closer to the receivers, and hence closer to the surface of the sea floor, than they actually are. Conversely, if the sound pulse is reflected from a convex discontinuity, the receivers will effectively model the discontinuity as being smaller than it actually is, and portions of the surface of the discontinuity with normals increasingly deviating from the normal will be increasingly modeled as being farther from the surface of the sea floor, than they actually are.

Several techniques have been developed to correct such deviations. In one such technique, termed "depth migration," the signal data as received by the receivers are processed to effectively simulate a situation in which the source and receivers, in a series of iterations, are step-by-step moved downwardly. In such a "downward migration" procedure, with each step the models of the discontinuities contained within the portion of the profile traversed by the step are corrected.

SUMMARY OF THE INVENTION

The invention provides a massively parallel computer arrangement for analyzing seismic data in accordance with a depth migration technique to model subsurface structures.

In brief summary, the invention provides massively parallel computer arrangement and method for processing seismic data, comprising signal amplitude as received by a plurality of receivers each for a plurality of shots, to generate a profile of subterranean formations. Initially, the arrangement, iteratively for a plurality of subsets of the shot data referred to as "shot chunks," converts, the signal amplitude data into frequency component amplitude data identifying the amplitudes of the frequency components of the signal data. After that is done for all of the shot chunks, the arrangement iteratively processes the amplitude data for successive frequency chunks to generate a profile, during each iteration iteratively generating profile information for successive subterranean layers and processing the frequency component amplitude data to downward-migrate the receiver and shot data to facilitate generating profile information for the next layer.

In a further aspect, the invention provides a massively-parallel computer arrangement for processing seismic data of a predetermined number of shots over a selected geographical area and for a predetermined number of receivers to generate a subterranean profile of the selected area. The arrangement comprises a plurality of processing elements each including a memory having a plurality of addressable storage locations, an interconnection network for enabling the processing elements to transfer data in a preselected regular pattern, a data store for storing seismic data in frequency-component amplitude form, the frequency-component amplitude data comprising a series of amplitude values for successive frequency components of signals received by the receivers, and a control arrangement.

The control arrangement, in turn, includes a processing element grid establishment element for enabling the interconnection network to establish a two-dimensional grid pattern defining a shot axis having at least as many processing elements as shots and a frequency axis. A data loading control element enables the data store to iteratively transfer successive chunks of frequency-component amplitude data to the processing elements for storage in their respective memories, each processing element storing, in successive storage locations of its respective memory, a frequency-component amplitude data item for successive receivers for a shot corresponding to its position along the shot axis, for a frequency in within the chunk corresponding to its position along the frequency axis. A depth migration control element enables, for each chunk of frequency-component amplitude data transferred to the precessing elements, and in a series of depth-migration iterations, the processing elements to iteratively generate, in parallel along the shot axis, chunk profile data for a particular frequency chunk using the frequency component amplitude data along the frequency axis, the depth migration control element enabling the processing elements to perform a downward-migration operation in connection with the frequency component amplitude data after enabling generation of chunk profile data to thereby facilitate generation of chunk profile data for successive subterranean layers. The chunk profile data for the successive frequency chunks constitutes the subterranean profile of the selected area.

In another aspect, the invention provides a control arrangement for controlling processing of seismic data by a massively-parallel computer. The massively-parallel computer comprises a plurality of processing elements each including a memory having a plurality of addressable storage locations, an interconnection network for enabling the processing elements to transfer data in a preselected regular pattern, and a data store for storing seismic data. The control arrangement enables the massively-parallel computer to process seismic data of a predetermined number of shots over a selected geographical area and for a predetermined number of receivers to generate a subterranean profile of the selected area, the seismic data being in frequency-component amplitude form, the frequency-component amplitude data comprising a series of amplitude values for successive frequency components of signals received by the receivers.

The control arrangement includes a processing element grid establishment element for enabling the interconnection network to establish a two-dimensional grid pattern defining a shot axis having at least as many processing elements as shots and a frequency axis. A data loading control element enables the data store to iteratively transfer successive chunks of frequency-component amplitude data to the processing elements for storage in their respective memories, each processing element storing, in successive storage locations of its respective memory, a frequency-component amplitude data item for successive receivers for a shot corresponding to its position along the shot axis, for a frequency in within the chunk corresponding to its position along the frequency axis. A depth migration control element enables, for each chunk of frequency-component amplitude data transferred to the processing elements, and in a series of depth-migration iterations, the processing elements to iteratively generate, in parallel along the shot axis, chunk profile data for a particular frequency chunk using the frequency component amplitude data along the frequency axis, the depth migration control element enabling the processing elements to perform a downward-migration operation in connection with the frequency component amplitude data after enabling generation of chunk profile data to thereby facilitate generation of chunk profile data for successive subterranean layers. The chunk profile data for the successive frequency chunks constituting the subterranean profile of the selected area.

In yet another aspect, the invention provides A method of controlling a massively-parallel computer to generate a subterranean profile of a selected area. The massively-parallel computer comprises a plurality of processing elements each including a memory having a plurality of addressable storage locations, an interconnection network for enabling the processing elements to transfer data in a preselected regular pattern, and a data store for storing seismic data, in response to seismic data of a predetermined number of shots over a selected geographical area and for a predetermined number of receivers. The seismic data is in frequency-component amplitude form, and comprising a series of amplitude values for successive frequency components of signals received by the receivers. The method initially enables the interconnection network to establish a two-dimensional grid pattern defining a shot axis having at least as many processing elements as shots and a frequency axis. The data store is enabled to iteratively transfer successive chunks of frequency-component amplitude data to the processing elements for storage in their respective memories, each processing element storing, in successive storage locations of its respective memory, a frequency-component amplitude data item for successive receivers for a shot corresponding to its position along the shot axis, for a frequency in within the chunk corresponding to its position along the frequency axis. For each chunk of frequency-component amplitude data transferred to the processing elements, and in a series of depth-migration iterations, the processing elements are enabled to iteratively generate, in parallel along the shot axis, chunk profile data for a particular frequency chunk using the frequency component amplitude data along the frequency axis, the depth migration control element enabling the processing elements to perform a downward-migration operation in connection with the frequency component amplitude data after enabling generation of chunk profile data to thereby facilitate generation of chunk profile data for successive subterranean layers. The chunk profile data for the successive frequency chunks constitute the subterranean profile of the selected area.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2D depict the organization of data in the memories of the processing elements of the massively-parallel computer system and in the mass storage system at successive processing stages;

FIG. 3 depicts a flow diagram detailing operations performed by the massively-parallel computer system depicted in FIG. 1, in connection with the processing stages depicted in FIGS. 2A through 2D; and FIGS. 4A through 4C together depict a flow diagram detailing operations performed by the massively-parallel computer system depicted in FIG. 1, in connection with performing a depth migration operation to process seismic data to generate a profile of subterranean discontinuities.

DETAILED DESCRIPTION OF AN ILLUSTRATIVE EMBODIMENT

Figure 1:
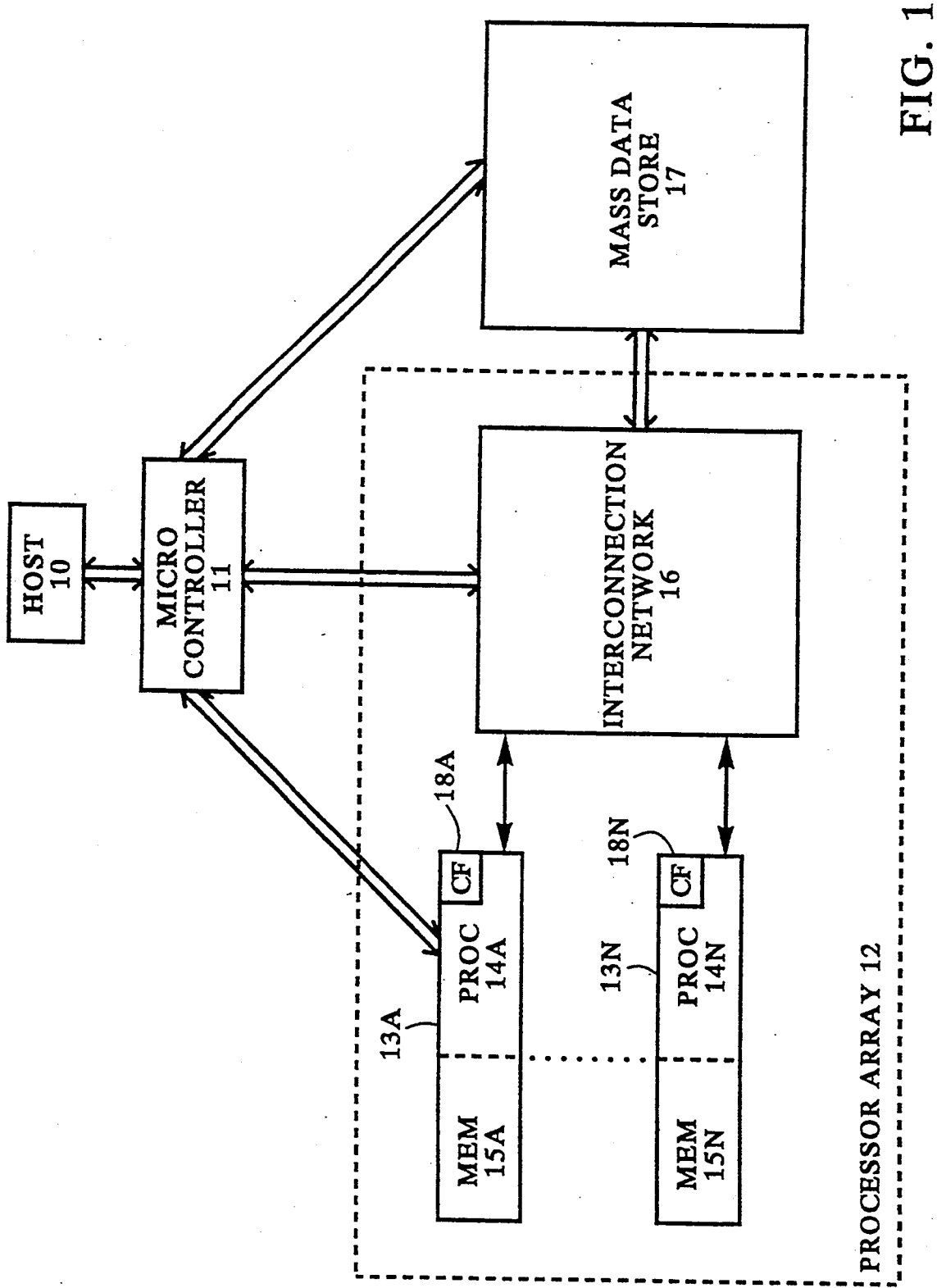
FIG. 1 depicts the structure of a massively-parallel computer system for use in connection with the invention.

A massively parallel computer arrangement for analyzing seismic data pursuant to pre-stack depth migration methodology in accordance with the invention can incorporate a massively parallel computer system having a functional organization such as depicted in the aforementioned U.S. Pat. Nos. 4,598,400, 4,814,973 and 4,984,235. Such a computer system is generally depicted in the block diagram of FIG. 1. With reference to FIG. 1, the massively parallel computer system includes a host 10 which transmits commands to a microcontroller 11 to control processing by a processor array 12. The processor array 12 includes a number of processing elements 13A through 13N [generally identified by reference numeral 13($i$)], each including a processor 14($i$) and a memory 15($i$).

The microcontroller 11 transmits control signals that enable the processors 14($i$) to, in parallel, process items of data in their respective memories 15($i$). In one embodiment, addresses of locations in the memories 15($i$) to be processed by the processors 14($i$) can be selectively provided either by the microcontroller 11, or they may be generated and maintained locally at each of the processors 14($i$). The control signals provided by the microcontroller 11 enable the processors 14($i$) to use either the locally-generated addresses or addresses provided by it in identifying locations containing data to be processed.

The processor array 12 also includes an interconnection network 16 which, under control of the microcontroller 11, transfers data among the processing elements 13($i$). In one particular embodiment, the interconnection network 16 is in the form of a hypercube, which can emulate a two-dimensional grid network as described in the aforementioned U.S. Pat. No. 5,050,069.

The massively-parallel computer system further includes a mass data store 17. In one embodiment, the mass data store 17 comprises a disk storage system which stores data in magnetic form in a series of addressable storage locations, such as described in the aforementioned Hillis, et al., patent application.

The arrangement processes seismic data generally recorded in serial form on, for example, magnetic tape. The arrangement processes the seismic data in two general sequences. During a first sequence, which is described below in connection with FIGS. 2A, 2B and 3, the processor array 12, under control of the host 10 and microcontroller 11, process the seismic data to generate an intermediate data structure form from the initial serial form, to facilitate processing during the second sequence. During the second sequence, which is described below in connection with FIGS. 2C, 2D and 4A through 4C, the processor array 12, under control of the host 10 and microcontroller 11, performs a series of depth migration operation in connection with the intermediate data, structure to generate data representing a depth-migrated profile of the seismic data, which essentially depicts the structures and profiles of subterranean discontinuities. Generally, the amount of seismic data defining a profile is so voluminous that it cannot be loaded and processed at one time within a computer, and the operations described in connection with FIGS. 2A through 4C are such as to permit the data to be divided into a plurality of chunks that can be separately processed and the results of processing of the separate chunks combined to produce unified processed seismic data representing the depth-migrated profile.

Initially the seismic data is in the form of digital data words, each representing the amplitude of a received signal at a particular point in time and for a particular shot. The seismic data is generally organized serially on magnetic tape such that digital data representing signal amplitudes as received by the successive receivers for a specific shot and at a specific time are recorded serially on the tape. Blocks of data for successive times within a shot are recorded serially on the tape, and blocks of shot data for the successive shots are also recorded serially. In this organization, the data may be viewed as being at particular locations on the tape which may be identified by addresses in which the shot identifier forms the high-order portion of the address, the time identifier forms the middle-order portion of the address and the receiver identifier forms the low-order portion of the address. The seismic data from the tape are loaded onto the mass storage system in similar organization.

Figure 2A:
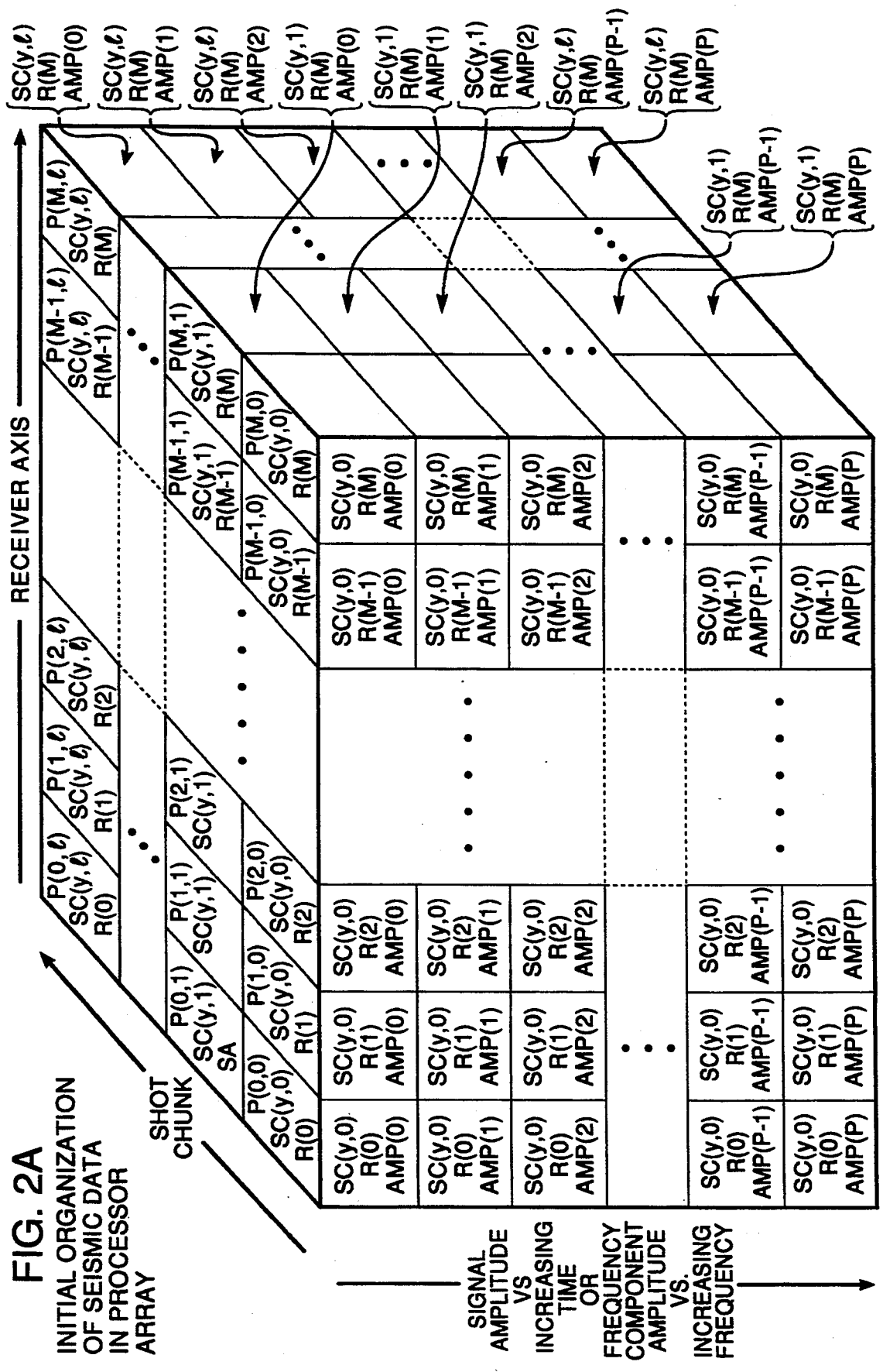

With respect initially to FIGS. 2A and 3, in performing the initial sequence the host 10 initially enables the microcontroller 11 to establish, within the processor array 12, a processing element grid having two-dimensions (step 70). As described in the aforementioned U.S. Pat. No. 5,050,069, this operation will entail identifying two axes, assigning to each processing element 13(i) nearest-neighbor processing elements to form the two-dimensional grid, and identifying for each processing element particular interconnections in the hypercube interconnection network to be used to define the two-dimensional grid. With reference to FIG. 2A, one dimension of the grid will define a receiver axis, and will have at least as many processing elements 13(i) along the axis as the number of receivers that were used during the seismic data acquisition. The other dimension will define a shot chunk axis, and will have at most a number of processing elements 13(i) such that the number of processing elements in the dimension of the grid along the receiver axis, multiplied by the number of processing elements in the dimension of the grid along the shot chunk axis, equals the number of processing elements 13(i) in the processor array 12. After the grid is identified, the host 10 can identify the number of processing elements along the shot chunk axis (step 71), which value corresponds to the maximum number of shots, which will be identified by index "l" whose seismic data can be loaded into the memories 15(i) of the processing elements 13(i) at one time.

Thereafter, the host 10 iteratively performs a series of operations to enable the processing elements 13(i) to transform the seismic data, which for each receiver represents the amplitude of the signal received by the receiver as a function of time, to the amplitudes of various frequency components of the signal received by the receiver; otherwise stated, the host enables the seismic data to be transformed from the "time domain" to the "frequency domain." In that operation, the host 10 enables a portion of the seismic data to be loaded into the memories 15(i) of the processing elements 13(i) in the processor array 12 as shown in FIG. 2A (step 72), with the number of shots of data to be loaded being limited by the value determine in step 71.

FIG. 2A depicts a prism-like structure representing the organization of data in the memories 15(i) of the processing elements 13(i) in the processor array 12 following step 72. With reference to FIG. 2A, the prism includes an upper face, defined by the horizontal arrow labeled "Receiver Axis" and the skewed arrow labeled "Shot Chunk," from which depend a series of columns of blocks parallel to the downwardly-extending arrow labeled "Signal Amplitude Vs. Increasing Time." Each column represents a processing element 13(i) associated with a particular shot in the shot chunk as determined by its relative position along the shot chunk axis, and a particular receiver as determined by its relative position along the receiver axis.

Each column is identified by a legend "P(i,j)" in the top face representing a processing element identifier in the two-dimensional grid as described above, where the index "i" identifies the particular receiver along the receiver axis, and index "j" identifies a particular shot from the beginning of the shot chunk. Also shown in the top face of each column is the legend "SC(y,j)" which identifies the particular shot "j" within a shot chunk "y" within the series of "Y" shot chunks forming the shot data. The top face of each column also bears the legend "R(i)" which identifies the particular receiver "i" within the series of receivers.

Each block in a column represents a storage location in the memory 15(i) of a processing element 13(i), with the series of blocks in each column representing the series of storage locations identified by increasing addresses. The series of blocks extending downwardly in each column, in the direction defined by the downwardly-extending arrow, represent storage locations in which are stored signal amplitude data for successive times. The front face of each block bears the legends "SC(y,j)" and "R(i)" associated with the column, and also the legend "AMP(t)" which identifies the signal amplitude at a particular time "t" within the series of successive times at which the seismic data was recorded.

In enabling the loading of the seismic data from the mass data store 17 into the storage locations in the memories 15(i) in step 72, it will be appreciated that, given the above-described ordering of the seismic data as recorded on the magnetic tape, the host 10 and microcontroller 11 will enable the seismic data for a particular shot and time and for successive receivers to be transferred from the mass data store 17 and loaded into storage locations of memories 15(i) of the processing elements 13(i) in along the receiver axis of the grid associated with the particular shot and time associated with the seismic data. These operations will be repeated for each subsequent time for the same shot, and similar operations will be performed for each subsequent shot until data has been loaded up to the maximum number of shots "l" as determined in step 71.

Thus, with reference to FIG. 2A, the host 10 will initially enable data to be loaded row by row into storage locations in the memories of processing elements identified by legend P(i,0), in order of increasing receiver identifier index "i." After the seismic data representing signal amplitudes for the first shot, represented by coordinate SC(y,0) where index "y" equals zero, and the first time, represented by the coordinate AMP(t) where index "t" equals zero, has been loaded into the storage locations of the row of processing elements P(i,0), the operations will be repeated for the next row of storage locations, until all of the seismic data for that shot have been loaded. These operations will be repeated until all of the data has been loaded, or until the maximum number of shots "l" have been loaded.

Following step 72, the host 10, through the microcontroller 11, enables the processing elements 13(i) to, in parallel, perform a fourier transform operation in connection with the signed amplitude data stored in their memories 15(i) (step 73). The result is a series, of successive values representing the relative amplitudes of various frequency components of the signal whose amplitudes are defined by the signal amplitude data, with the series of sequential storage locations being associated with the series of sequential frequency components comprising the signal. The frequency component amplitude data is organized in the memories 15(i) of the processing elements 13(i) in the processor array 12 in the same way as shown in FIG. 2A, except that the blocks in each column represent storage locations in which the frequency component amplitude data, rather than signal amplitude is stored, although it will be recognized that the number of items of frequency component amplitude data stored in the memory 15(i) of the processing elements 13(i) may differ from the number of items of previously stored signal amplitude data. At this point in the sequence, the legend AMP(fc) will refer to the frequency component amplitude as a function of the index "fc," rather than the signal amplitude as a function of time.

Figure 2B:
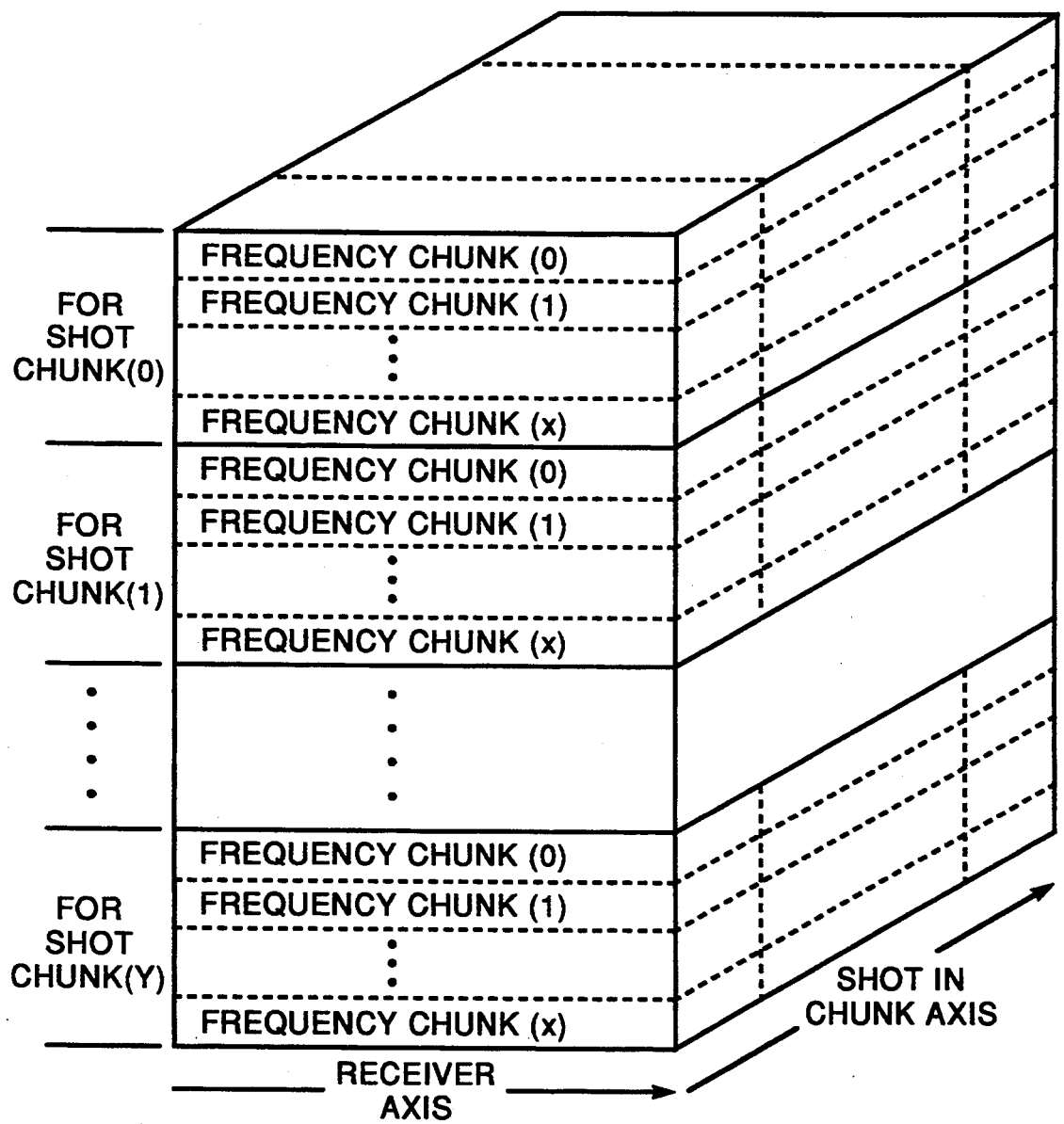

Thereafter, the host 10, through microcontroller 11, enables the processing elements 13(i) to transfer the frequency component amplitude data from their respective memories 15(i) to the mass storage system 17 (step 74). FIG. 2B depicts the organization of this data when stored in the mass storage system. With reference to FIG. 2B, the data is transferred to the mass storage system 17 essentially in layers of the prism depicted in FIG. 2B. That is, for a particular frequency component index "fc", the host 10 will enable the frequency component amplitude data from all of the successive processing elements 13(i) along the receiver axis and successively along a "shot in chunk" axis to be transferred to the mass data storage. The host 10 will similarly iteratively enable the frequency component amplitude data from all processing elements 13(i) for all frequency component indices "fc" to be transferred. For the first shot chunk, the result of the transfer depicted in FIG. 2B as the portion labeled "For Shot Chunk (0)."

Thereafter, the host 10 determines whether all of the seismic signal amplitude data has been processed, and the processed frequency component amplitude data stored in mass storage system 17, according to steps 72 through 74 (step 75). If not, the host returns to step 72 to process seismic data representing another shot chunk. During step 74 of this next iteration, in which the host 10 enables the frequency component amplitude data for the next shot chunk, that is, shot chunk (1), it enables the generated frequency component amplitude data to be appended in the mass storage system 17 to the frequency component amplitude data generated during the previous iteration, as shown in FIG. 2B. These operations are repeated for a series of iterations, with the host 10 enabling the generated frequency component amplitude data to be appended in the mass storage system 17 to the frequency component amplitude data generated during the previous iteration, as shown in FIG. 2B, until it determines in step 75 that the data from all of the shots has been processed.

When the host 10 determines in step 75 that data from all of the shots has been processed, it sequences to step 76 to determine a frequency chunk number value to be used during the sequence to be described below in connection with FIGS. 4A through 4C. The generation of the frequency chunk number value will be described in connection with FIG. 2C, which depicts the organization of data in the processor array 12 during the sequence depicted in FIGS. 4A through 4C. Like FIG. 2A, FIG. 2C depicts a prism-like structure representing the organization of data in the memories 15(i) of the processing elements 13(i) in the processor array 12 near the beginning of the sequence depicted in FIGS. 4A through 4C. The prism includes an upper face, defined by the horizontal arrow labeled "Shot Axis" and the skewed arrow labeled "Frequency Axis," from which depend a series of columns of blocks parallel to the, downwardly-extending arrow labeled "Receiver Axis." Each column represents a processing element 13(i) associated with a particular shot as determined by its relative position along the shot chunk axis, and a particular frequency in a frequency chunk, as determined by its relative position along the receiver axis. In the sequence depicted in FIGS. 4A through 4C, the number of processing elements 13(i) along the shot axis corresponds to the number of shots in all shot chunks.

Each column is identified by a legend "P(i,k)" in the top face representing a processing element identifier in the two-dimensional grid as described above, where index "i" identifies a particular shot, and the index "k" identifies the particular frequency component along the frequency axis. Also shown in the top face of each column is the legend "S(i)" which identifies the particular shot "i" within the series of "J" shots forming the shot data. The top face of each column also bears the legend FC(f,k), which identifies the frequency component "k" in the series of frequency chunks "f" whose amplitude data is associated with the column.

Each block in a column represents a storage location in the memory 15(i) of a processing element 13(i), with the series of blocks in each column representing the series of storage locations identified by increasing addresses. The series of blocks extending downwardly in each column, in the direction defined by the downwardly-extending arrow, represent storage locations in which are stored amplitude data associated with successive receivers. The front face of each block bears the legends "FC(f,k)" and "S(i)" associated with the column, and also the legend "R(m)" which identifies the particular receiver within the series of "M" receivers recording seismic data. Essentially, for the series of processing elements 13(i) along the frequency axis associated with a particular shot S(i) along the shot axis, the series of storage locations at a particular address associated with a particular receiver R(m) contain amplitude data for a series of frequency components.

With this background, in the sequence depicted in FIGS. 4A through 4C, processing elements 13(i) may process a subset of the number of frequencies whose amplitudes were generated in step 73. It will be appreciated that the maximum number of frequencies in the subset corresponds to the number of processing elements 13(i) divided by the number of shots, which was be determined by the host 10 in step 76.

After the host 10 has determined the number of frequencies to be included in a frequency chunk (step 76, FIG. 3) it steps to a series of preparatory steps 100 through 107 (FIG. 4A). Preliminarily, the operations performed in the sequence depicted in FIGS. 4A through 4C essentially comprise two nested loops. In one "inner loop," the host 10 enables the processor array 12 to iteratively perform a series of processing operations on frequency component amplitude data from a frequency chunk. In successive inner loop iterations, the processing effectively results in generation of successively lower layers of the subterranean profile, using the frequency component amplitude data from one frequency chunk. In the "outer loop," the host enables these "inner loop" iterations to occur in connection with each of the series of frequency chunks. The result after all of the outer loop iterations is the subterranean profile using all of the frequency component amplitude data.

Accordingly, the host 10 initially establishes a frequency chunk termination identifier identifying the number of frequency chunks defining the previously-generated frequency component amplitude data (step 100). It will be appreciated that the value established in the frequency chunk termination identifier will correspond to the frequency chunk number determined in step 76 (FIG. 3). Thereafter, the host 10 establishes and initializes a frequency chunk index counter (step 101) which will be used to determine when all frequency chunks have been processed.

Figure 2D:
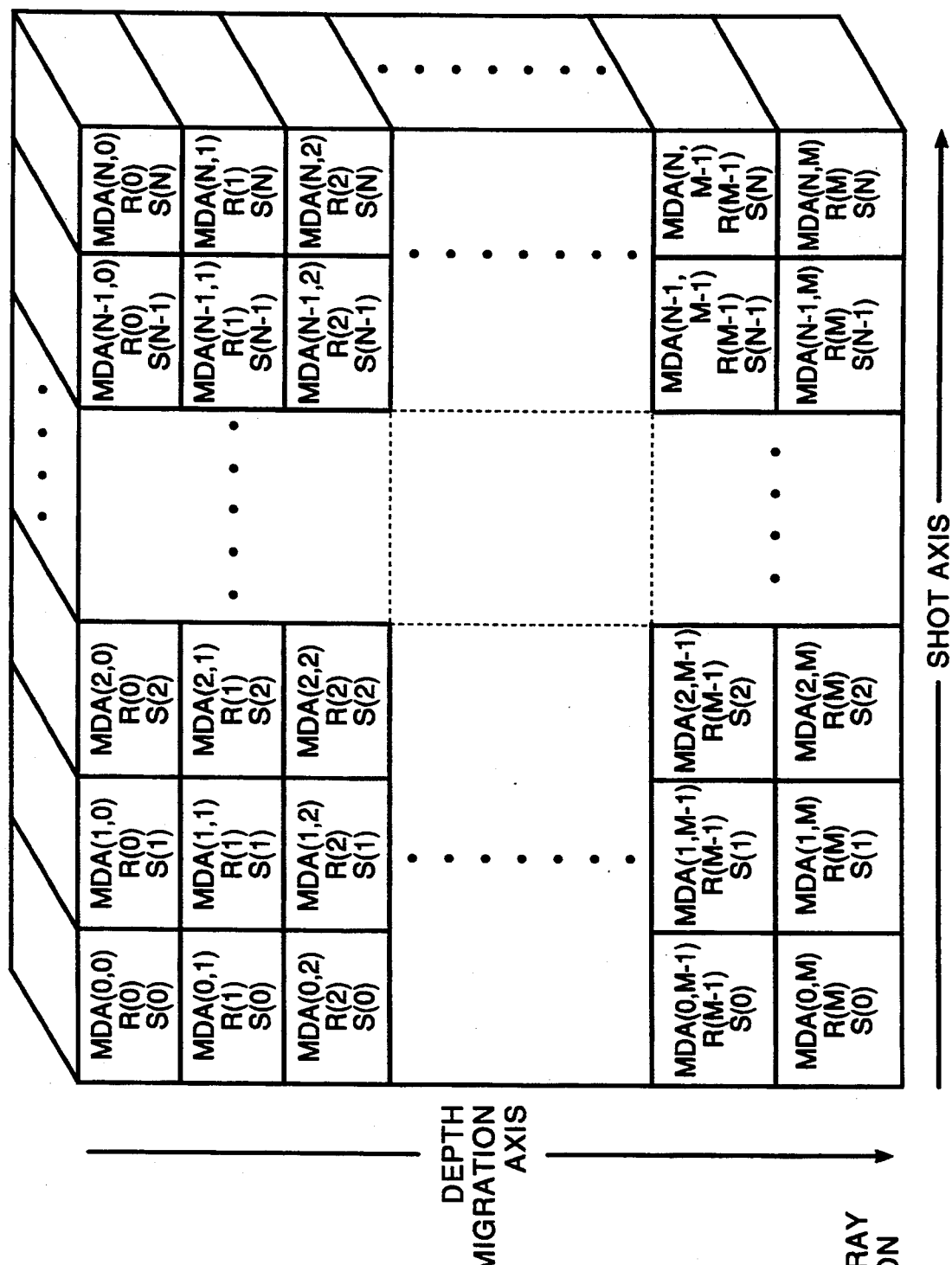

The host 10 then enables selected ones of the processing elements 13(i) to establish in their memories 15(i) a two-dimensional migrated data accumulator array, whose organization is shown in FIG. 2D (step 102). With reference to FIG. 2D, the migrated data accumulator array comprises a set of storage locations in memories 15(i) of all least some processing elements 13(i), the storage locations being organized in rows and columns as shown in FIG. 2D. Each row consists of storage locations at the same address location in a series of processing elements 13(i), with each column consisting of a series of storage locations in the processing element 13(i). The processing elements 13(i) containing a row of the migrated data accumulator array comprise a series of processing elements 13(i) along the shot axis (FIG. 2C), and accordingly the migrated data accumulator array essentially is parallel to a plane of storage locations represented by the prism shown in FIG. 2C, parallel to a plane defined by the shot axis and the receiver axis.

Thereafter, the host 10 establishes a depth migration termination identifier to identify the number of depth migration steps to be performed (step 103). Essentially, in step 103, the host 10 determines the number of inner loop iterations to be performed. In that operation, the host 10 makes use of several values, including the maximum depth from which signal amplitude data was received and whose data was used in the operations described in connection with FIG. 3, along with the depth interval of the profile layer processed during each of the inner loop iterations. The maximum depth from which signal amplitude data was received relates to the maximum time for signal reflections of the original seismic data. With this information, host 10 determines the number of depth migration steps to be performed as the maximum depth from which signal amplitude data was received divided by the depth interval of the profile layer processed during each inner loop iteration.

The host 10 also establishes and initializes a depth migration index counter (steps 104 and 105). The host essentially uses the depth migration index counter as the inner loop counter.

Thereafter, the host 10 enables the mass data store 17 to transfer the frequency component amplitude data from the frequency chunk identified by the frequency chunk index counter, which during the first outer loop iteration equals zero, and load it into the processor array 12, such that the data has the organization shown in FIG. 2C (step 106). With reference to FIG. 2B, the host 10 enables the mass data store 17 to iteratively transfer the frequency component amplitude data for "Frequency Chunk (0)" (where "0" corresponds to the value of the frequency chunk index counter) from the mass data storage 17 for each of the successive shot chunks. With reference to FIG. 2C, the host 10 will enable the data for the successive shot chunks to be transferred to processing elements 13(i) progressively along the shot axis. With reference again to FIG. 2B, in one embodiment in which the data is organized in the mass data store 17 as shown in FIG. 2B, the data will be transferred to the processor array such that the frequency axis and the receiver axis will be interchanged; in that embodiment, the host 10 will enable the processor array 12 to perform a transpose operation so that the data will be organized as shown in FIG. 2C.

The host 10 also selects a zero-offset axis offset identifier based on previously-supplied zero-offset axis data (step 107) as described in the aforementioned Claerbout text. The zero-offset axis offset identifier identifies one of the receivers as receiving zero-offset signal amplitude data, and the identification essentially will be used as an offset along the receiver axis (FIG. 2C) as described below.

After selecting a zero-offset axis offset identifier, the host 10 enables the processing elements 13(i) to, in parallel for all shots along the shot axis, generate sums of the frequency component amplitude in the storage locations along the frequency axis at offsets along the receiver axis corresponding to the zero-offset axis offset identifier (step 110). The processing elements 13(i) may perform this operation in a number of ways. In one way, procedure the processing elements 13(i) at one end of the frequency axis may transmit the data item at the offset identified by the zero-offset axis offset identifier to the next processing element 13(i) along the frequency axis. The processing element 13(i) which receives the data item will add the value of the received data item to its corresponding data item, and transmit the sum to the next processing element 13(i) along the frequency axis. The processing elements 13(i) may repeat this operation across the frequency axis.

Alternatively, the processing elements 13(i) may generate the sum by performing a "scan" operation, as described in the aforementioned Blelloch text. Essentially, the result of processing in step 110 is the sum of all frequency component amplitude values for the receiver identified as receiving zero-offset signal amplitude data, for each shot. The host 10 then enables the processing elements 13(i) to add the sums generated in step 110 in the migrated data array (FIG. 2D) in the top row, which corresponds to the row whose depth offset is identified by the value of the depth migration index counter (step 111), as the contribution to the subterranean profile as provided by the frequency component amplitude data in the first frequency chunk. It will be appreciated that the processing elements 13(i) in which the migrated data accumulator array was established in step 103 may correspond to those processing elements 13(i) which generate a value corresponding to the sum across the entire frequency axis. This will avoid requiring those processing elements to transmit the sum to other processing elements 13(i) for storage.

The host 10 then increments the depth migration index counter (step 112) and determines whether the value of the depth migration index counter corresponds to the value of the depth migration termination identifier (step 113). If not, the host 10 has not enabled processor array 12 to complete the subterranean profile, and so it sequences to steps 114 and 115, in which it enables the processors 13(i) in processor array 12 to downward-migrate both the receivers and the source, essentially enabling the processors 13(i) to generate frequency component amplitude data corresponding to that which would have been generated in step 73 (FIG. 3) if the receivers (step 114) and source (step 115) had been at a level at the underside of the previously-processed layer. With reference to FIG. 2C, in the downward-migration operation, the host enables the processing elements 13(i) to perform processing operations such that frequency component amplitude data in each storage location is a predetermined element of a tri-diagonal matrix in the plane defined by the shot axis and the receiver axis, which is processed to generate an updated value for the storage location. In downward-migrating the receivers the processing operations are along the shot axis, and in downward-migrating the source the processing operations are along the receiver axis.

After the receiver and source downward-migration operations (steps 114 and 115), the host 10 returns to step 110 to initiate another iteration. In that iteration, the host 10 again enables the processing elements 13(i) to generate another set of sums of the downward-migrated frequency component amplitude data in the storage locations along the frequency axis. In this iteration, the processing elements 13(i) generates the sums at the same offsets along the receiver axis as previously, that is, the offset corresponding to the zero-offset axis offset identifier (step 110). Thereafter, the host 10 enables the processing elements 13(i) to add the sums generated in step 110 of the second iteration in the migrated data array (FIG. 2D) in the second row, which corresponds to the row whose offset is identified by the incremented value of the depth migration index counter (step 111), as the contribution to that portion of the subterranean profile as provided by the frequency component amplitude data in the first frequency chunk.

Following step 111, the host 10 again increments the depth migration index counter (step 112) and determines whether the value of the depth migration index counter corresponds to the value of the depth migration termination identifier (step 113) and, if not, downward-migrates the receivers (step 114) and source (step 115) prior to initiating another iteration. It will be appreciated that at some iteration the host 10 will determine in step 113 that the value of the depth migration index counter corresponds to the depth migration termination counter. At that point, the processor array 12 has generated migrated data for all of the rows in the migrated data accumulator array for the first frequency chunk.

The host 10 will then sequence to step 116 (FIG. 4C) to increment the frequency chunk index counter. Thereafter, the host 10 will determine whether the value of the frequency chunk index counter corresponds to the value of the frequency chunk loop termination identifier established in step 103. If all of the frequency chunks were not processed during the first outer loop iteration, the host 10 will at this point determine that the value of the frequency chunk index counter does not correspond to the value of the frequency loop termination identifier. In that case, the host 10 will return to step 105 to re-initialize the depth migration index counter and initiate another iteration to enable the processor array 12 to generate migrated data for all of the rows in the migrated data accumulator array for the second frequency chunk.

These operations are iteratively repeated until the processor determine that the incrementation of the frequency chunk index counter in step 116 will be such that the host 10 will determine in step 117 in the value of the frequency chunk index counter corresponds to the value of the frequency chunk loop termination identifier. At that point, the processor array 12 will have generated migrated data for all of the rows in the migrated data accumulator array for the all frequency chunks, and the host 10 will exit (step 120).

After the host 10 exits, the migrated data accumulator array (FIG. 2D) will contain data defining the subterranean profile over which the shot data was accumulated. Essentially, the pattern of high value accumulated migrated data in the array will define the pattern of subterranean discontinuities.

It will be appreciated that the arrangement facilitates the parallel processing of seismic data, such that the processing can take place much more rapidly than with a conventional serial computer. The arrangement divides the generally massive amounts of data into chunks that will fit into the memories 15(i), with the chunks being such that processing can take place separately from the other chunks.

It should be noted that, in the sequence described in FIG. 3, in connection with the data organization shown in FIG. 2A, the shot chunks may have differing numbers of shots. In particular, as described above, the number of shots in a shot chunk during each iteration will generally be such that the number of processing elements in the dimension of the grid along the receiver axis, multiplied by the number of processing elements in the dimension of the grid along the shot chunk axis, equals the number of processing elements 13(i) in the processor array 12. However, the seismic data, particularly of the last shot chunk, may not contain enough shots therefor. In that case, the last shot chunk to be processed as described in FIG. 3 may have fewer shots. The processing as described in FIG. 3 is independent of the number of shots in a shot chunk.

Similarly, the processing as described in connection with FIGS. 4A through 4C is independent of the number of frequencies in a frequency chunk, which number may differ as among the various frequency chunks. However, since the processing elements 13(i) sum frequency component amplitude data along the frequency axis (step 110), it will be appreciated that when processing one frequency chunk which has fewer frequencies than other frequency chunks, amplitude data from the previously-processed frequency chunks which may still reside in some of the processing elements along the frequency axis should be zeroed to avoid being erroneously used in forming the sum. Alternatively, the massively-parallel computer system may be provided with other mechanisms to ensure that such data is not used.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A massively-parallel computer arrangement for processing seismic data of a predetermined number of shots over a selected geographical area and for a predetermined number of receivers to generate a subterranean profile of the selected area, the shots being divided into a series of shot chunks, the arrangement comprising:

A. a plurality of processing elements each including a memory having a plurality of addressable storage locations;

B. an interconnection network for enabling the processing elements to transfer data in a preselected regular pattern;

C. a frequency-component data store for storing, for each of the shot chunks, seismic data in frequency-component amplitude form, the frequency-component amplitude data for each of said shot chunks comprising a series of amplitude values for successive frequency components of signals received by the receivers for each of the shots in the shot chunk; and D. a control arrangement including:

i. a processing element migration grid establishment element for enabling the interconnection network to establish a two-dimensional grid pattern among said processing elements defining (a) a shot axis having at least as many processing elements as shots in individual ones of said shot chunks, and (b) a frequency axis;

ii. a data loading control element for enabling the frequency-component data store to transfer frequency-component amplitude data for a selected frequency component for all of said shots to the processing elements for storage in their respective memories, each processing element storing in successive storage locations of its memory the frequency-component amplitude data item for successive receivers for a shot corresponding to the processing element's position along the shot axis, for a frequency corresponding to the processing element's position along the frequency axis;

iii. a depth migration control element for enabling the processing elements to iteratively generate, in parallel along the shot axis, chunk profile data using the frequency component amplitude data loaded in response to the data loading control element, the depth migration control element enabling the processing elements to perform a downward-migration operation in connection with the frequency component amplitude data to generate chunk profile data for a subterranean layer; and iv. a frequency-chunk iteration control element for enabling said data loading control element and said depth migration control element to operate in a series of iterations, the iteration control element enabling the data loading control element to select successive ones of said frequency components in successive iterations.

2. An arrangement as defined in claim 1 wherein said control arrangement further includes a frequency-component amplitude generation element for enabling the processing elements to generate, in response to the seismic data, the frequency-component amplitude data in parallel.

3. An arrangement as defined in claim 2 further including a seismic data store for storing the seismic data, the seismic data comprising, for each shot and for each receiver, successive signal amplitude values representing amplitude of a signal received by the receiver at successive points in time, the frequency-component amplitude generation element including:

A. a processing element frequency-component grid establishment element for enabling the interconnection network to establish a two-dimensional grid pattern among said processing element defining (a) a shot axis and (b) a receiver axis having at least as many processing elements as receivers;

B. a seismic data input control element for enabling a chunk of seismic data to be transferred from the seismic data store to the processing element for storage in their respective memories, each chunk corresponding to the number of processing elements along the shot axis, successive processing elements along the receiver elements receiving seismic data from successive ones of said receivers, and successive processing elements along the shot axis receiving seismic data from successive shots, each processing element storing in successive storage locations of its memory the successive signal amplitude values for the receiver and shot determined by the processing element's location along the shot and receiver axes;

C. a frequency-component generation control element for enabling the processing element to, in parallel, generate the frequency-component amplitude data in response to the seismic data in its memory;

D. a frequency-component amplitude data output control element for enabling the transfer of the frequency-component data from the processing elements to the frequency-component data store for storage; and E. a seismic data chunk iteration control element for enabling the seismic data input control element, the frequency-component generation control element, and the frequency-component amplitude data output control element in a series of iterations in connection with successive seismic data chunks.

4. An arrangement as defined in claim 1 in which said control arrangement further includes a migrated depth array establishment element for enabling a selected series of processing elements along the shot axis established by the processing element migration grid establishment element to establish a migrated depth array having a shot axis of the interconnection network and a depth migration axis corresponding to successive storage locations in the respective memories of the selected series, the depth migration control element using the migrated depth array in generating the chunk profile data.

5. An arrangement as defined in claim 4 in which the depth migration control element includes:

A. an adder element for enabling the processing elements to generate sums along the frequency axis, of frequency-component amplitude data in a selected storage location in their respective memories;

B. a receiver downward-migration element for enabling the processing elements to perform a receiver down-migration operation in connection with frequency-component amplitude data to generate receiver downwardly-migrated frequency-component amplitude data;

C. a shot-source downward migration element for enabling the processing elements to perform a shot source down-migration operation in connection with the receiver downwardly-migrated frequency-component amplitude data to generate source-and-receiver downwardly-migrated frequency-component amplitude data; and D. a downward migration iteration control element for enabling said adder element, said receiver downward-migration element and said shot-source downward migration element to operate in a series of iterations, the downward migration iteration control element enabling said adder element to select successive ones of the storage locations as successive selected storage locations in successive iterations, and further enabling said receiver downward-migration element to use the source-and-receiver downwardly-migrated frequency-component amplitude data generated by the shot-source downward migration element during one iteration as the frequency-component amplitude data during a subsequent iteration.

6. An arrangement as defined in claim 5 in which said receiver downward-migration element enables the processing elements to perform a tri-diagonal solver operation in connection with frequency-component amplitude data along the shot axis.

7. An arrangement as defined in claim 5 in which said shot-source downward-migration element enables the processing elements to perform a tri-diagonal solver operation in connection with frequency-component amplitude data along the receiver axis.

8. A control arrangement for use in connection with a massively-parallel computer for processing seismic data of a predetermined number of shots over a selected geographical area and for a predetermined number of receivers to generate a subterranean profile of the selected area, the shots being divided into a series of shot chunks, the computer comprising a plurality of processing elements each including a memory having a plurality of addressable storage locations, an interconnection network for enabling the processing elements to transfer data in a preselected regular pattern and a frequency-component data store for storing, for each of the shot chunks, seismic data in frequency-component amplitude form, the frequency-component amplitude data for each of said shot chunks comprising a series of amplitude values for successive frequency components of signals received by the receivers for each of the shots in the shot chunk, the control arrangement comprising:

A. a processing element migration grid establishment element for enabling the interconnection network to establish a two-dimensional grid pattern among said processing elements defining (a) a shot axis having at least as many processing elements as shots in individual ones of said shot chunks, and (b) a frequency axis;

B. a data loading control element for enabling the frequency-component data store to transfer frequency-component amplitude data for a selected frequency component for all of said shots to the processing elements for storage in their respective memories, each processing element storing in successive storage locations of its memory the frequency-component amplitude data item for successive receivers for a shot corresponding to the processing element's position along the shot axis, for a frequency corresponding to the processing element's position along the frequency axis;

C. a depth migration control element for enabling the processing elements to iteratively generate, in parallel along the shot axis, chunk profile data using the frequency component amplitude data loaded in response to the data loading control element, the depth migration control element enabling the processing elements to perform a downward-migration operation in connection with the frequency component amplitude data to generate chunk profile data for a subterranean layer; and D. a frequency-chunk iteration control element for enabling said data loading control element and said depth migration control element to operate in a series of iterations, the iteration control element enabling the data loading control element to select successive ones of said frequency components in successive iterations.

9. A control arrangement as defined in claim 8 wherein further including a frequency-component amplitude generation element for enabling the processing elements to generate, in response to the seismic data, the frequency-component amplitude data in parallel.

10. A control arrangement as defined in claim 9, the computer further including a seismic data store for storing the seismic data, the seismic data comprising, for each shot and for each receiver, successive signal amplitude values representing amplitude of a signal received by the receiver at successive points in time, the frequency-component amplitude generation element including:

A. a processing element frequency-component grid establishment element for enabling the interconnection network to establish a two-dimensional grid pattern among said processing element defining (a) a shot axis and (b) a receiver axis having at least as many processing elements as receivers;

B. a seismic data input control element for enabling a chunk of seismic data to be transferred from the seismic data store to the processing element for storage in their respective memories, each chunk corresponding to the number of processing elements along the shot axis, successive processing elements along the receiver elements receiving seismic data from successive ones of said receivers, and successive processing elements along the shot axis receiving seismic data from successive shots, each processing element storing in successive storage locations of its memory the successive signal amplitude values for the receiver and shot determined by the processing element's location along the shot and receiver axes;

C. a frequency-component generation control element for enabling the processing element to, in parallel, generate the frequency-component amplitude data in response to the seismic data in its memory;

D. a frequency-component amplitude data output control element for enabling the transfer of the frequency-component data from the processing elements to the frequency-component data store for storage; and E. a seismic data chunk iteration control element for enabling the seismic data input control element, the frequency-component generation control element, and the frequency-component amplitude data output control element in a series of iterations in connection with successive seismic data chunks.

11. A control arrangement as defined in claim 8 further including a migrated depth array establishment element for enabling a selected series of processing elements along the shot axis established by the processing element migration grid establishment element to establish a migrated depth array having a shot axis of the interconnection network and a depth migration axis corresponding to successive storage locations in the respective memories of the selected series, the depth migration control element using the migrated depth array in generating the chunk profile data.

12. A control arrangement as defined in claim 11 in which the depth migration control element includes:
   A. an adder element for enabling the processing elements to generate sums along the frequency axis, of frequency-component amplitude data in a selected storage location in their respective memories;
   B. a receiver downward-migration element for enabling the processing elements to perform a receiver down-migration operation in connection with frequency-component amplitude data to generate receiver downwardly-migrated frequency-component amplitude data;
   C. a shot-source downward migration element for enabling the processing elements to perform a shot source down-migration operation in connection with the receiver downwardly-migrated frequency-component amplitude data to generate source-and-receiver downwardly-migrated frequency-component amplitude data; and
   D. a downward migration iteration control element for enabling said adder element, said receiver downward-migration element and said shot-source downward migration element to operate in a series of iterations, the downward migration iteration control element enabling said adder element to select successive ones of the storage locations as successive selected storage locations in successive iterations, and further enabling said receiver downward-migration element to use the source-and-receiver downwardly-migrated frequency-component amplitude data generated by the shot-source downward migration element during one iteration as the frequency-component amplitude data during a subsequent iteration.

13. A control arrangement as defined in claim 11 in which said receiver downward-migration element enables the processing elements to perform a tri-diagonal solver operation in connection with frequency-component amplitude data along the shot axis.

14. A control arrangement as defined in claim 11 in which said shot-source downward-migration element enables the processing elements to perform a tri-diagonal solver operation in connection with frequency-component amplitude data along the receiver axis.

15. A method of controlling a massively-parallel computer to generate a subterranean profile of a selected area, the computer comprising a plurality of processing elements each including a memory having a plurality of addressable storage locations, an interconnection network for enabling the processing elements to transfer data in a preselected regular pattern, and a frequency-component data store for storing, for each of a plurality of shot chunks, each comprising, for a predetermined number of shots over the selected area, seismic data in frequency-component amplitude form, the frequency-component amplitude data for each of said shot chunks comprising a series of amplitude values for successive frequency components of signals received by the receivers for each of the shots in the shot chunk, the method comprising the steps of:
   A. enabling the interconnection network to establish a two-dimensional grid pattern among said processing elements defining (a) a shot axis having at least as many processing elements as shots in individual ones of said shot chunks, and (b) a frequency axis;
   B. enabling the frequency-component data store to transfer frequency-component amplitude data for a selected frequency component for all of said shots to the processing elements for storage in their respective memories, each processing element storing in successive storage locations of its memory the frequency-component amplitude data item for successive receivers for a shot corresponding to the processing element's position along the shot axis, for a frequency corresponding to the processing element's position along the frequency axis;
   C. enabling the processing elements to iteratively generate, in parallel along the shot axis, chunk profile data using the frequency component amplitude data loaded during step (B), the processing elements being enabled to perform a downward-migration operation in connection with the frequency component amplitude data to generate chunk profile data for a subterranean layer; and
   D. performing steps (b) and (c) in a series of frequency chunk iterations, successive ones of said frequency components being selected to be transferred to said processing elements during successive iterations.

16. A method as defined in claim 15 further comprising the step of enabling the processing elements to, in parallel, generate the frequency-component amplitude data in response to the seismic data.

17. A method as defined in claim 16, the computer further including a seismic data store for storing the seismic data, the seismic data comprising, for each shot and for each receiver, successive signal amplitude values representing amplitude of a signal received by the receiver at successive points in time, the frequency-component amplitude generation step including the steps of:
   A. enabling the interconnection network to establish a two-dimensional grid pattern among said processing element defining (a) a shot axis and (b) a receiver axis having at least as many processing elements as receivers;
   B. enabling a chunk of seismic data to be transferred from the seismic data store to the processing element for storage in their respective memories, each chunk corresponding to the number of processing elements along the shot axis, successive processing elements along the receiver axis receiving seismic data from successive ones of said receivers, and successive processing elements along the shot axis receiving seismic data from successive shots, each processing element storing in successive storage locations of its memory the successive signal amplitude values for the receiver and shot determined by the processing element's location along the shot and receiver axes;
   C. enabling the processing element to, in parallel, generate the frequency-component amplitude data in response to the seismic data in its memory;
   D. enabling the transfer of the frequency-component data from the processing elements to the frequency component data store for storage; and E. performing steps (B) through (D) in a series of seismic data chunk iterations in connection with successive seismic data chunks.

18. A method as defined in claim 17 further comprising the steps of enabling a selected series of processing elements along the shot axis to establish a migrated depth array having a shot axis of the interconnection network and a depth migration axis corresponding to successive storage locations in the respective memories of the selected series, the migrated depth array being used in generating the chunk profile data.

19. A method as defined in claim 18 in which the depth migration step includes the steps of:
   A. enabling the processing elements to generate sums, along the frequency axis, of frequency-component amplitude data in a selected storage location in their respective memories;
   B. enabling the processing elements to perform a receiver down-migration operation in connection with frequency-component amplitude data to generate receiver downwardly-migrated frequency-component amplitude data;
   C. enabling the processing elements to perform a shot source down-migration operation in connection with the receiver downwardly-migrated frequency-component amplitude data to generate source-and-receiver downwardly-migrated frequency-component amplitude data; and
   D. performing steps (A) through (C) in a series of depth-migration iterations, successive ones of the storage locations being selected as successive selected storage locations in successive depth-migration iterations, the source-and-receiver downwardly-migrated frequency-component amplitude data generated during step (C) during one iteration being used as the frequency-component amplitude data during step (B) of a subsequent iteration.

20. A method as defined in claim 18 in which the processing elements perform, as the receiver down-migration operation, a tri-diagonal solver operation in connection with frequency-component amplitude data along the shot axis.

21. A method as defined in claim 18 in which the processing elements perform, as the shot source down-migration operation, a tri-diagonal solver operation in connection with frequency-component amplitude data along the receiver axis.

* * * * *